United States Patent
Chapin

(10) Patent No.: US 6,663,062 B1
(45) Date of Patent: *Dec. 16, 2003

(54) FOLDING POWER TOOL STAND ELEVATING DEVICE

(76) Inventor: S. Todd Chapin, 451 Chevy Chase Dr., Sarasota, FL (US) 34243

( * ) Notice: Subject to any disclaimer, the term of this patent is extended or adjusted under 35 U.S.C. 154(b) by 0 days.

This patent is subject to a terminal disclaimer.

(21) Appl. No.: 10/260,991

(22) Filed: Sep. 30, 2002

(51) Int. Cl.[7] ............................................... F16M 11/26
(52) U.S. Cl. ............................. 248/188.5; 248/346.03; 108/56.1; 182/186.6; 182/204
(58) Field of Search ........................... 248/188.5, 188.2, 248/346.06, 346.03, 346.02, 188.6; 182/204, 186.6, 141; 108/56.1, 56.3; 297/56

(56) References Cited

U.S. PATENT DOCUMENTS

| | | | | |
|---|---|---|---|---|
| 528,284 A | * | 10/1894 | Bartholomew | 182/204 |
| 3,071,204 A | * | 1/1963 | Piltingsrud | 182/204 |
| 3,177,035 A | * | 4/1965 | Halstrick | 248/188.5 |
| 4,216,933 A | * | 8/1980 | Cramer | 248/188.5 |
| 4,375,248 A | * | 3/1983 | Kishi | 182/141 |
| 4,457,397 A | * | 7/1984 | Scala | 182/200 |
| 4,752,102 A | * | 6/1988 | Rasmussen | 108/147 |
| 4,763,865 A | | 8/1988 | Danner | |
| 4,860,807 A | | 8/1989 | Vacchiano | |
| 4,944,366 A | * | 7/1990 | Pryor et al. | 182/141 |
| 5,107,958 A | * | 4/1992 | Johnson | 182/204 |
| 5,116,011 A | * | 5/1992 | Smith | 248/346 |
| 5,193,649 A | * | 3/1993 | Lee | 182/141 |
| 5,358,204 A | | 10/1994 | Terada | |
| 5,588,377 A | * | 12/1996 | Fahmian | 248/631 |
| 5,816,545 A | | 10/1998 | Malizia | |
| 5,984,245 A | | 11/1999 | Hsu | |
| 6,435,306 B2 | * | 8/2002 | Stoneburg | 182/204 |

* cited by examiner

*Primary Examiner*—Korie Chan
(74) *Attorney, Agent, or Firm*—Charles J. Prescott

(57) ABSTRACT

A folding power tool stand elevating device, the stand having fixed height x-shaped ground-engaging legs which pivot about a central horizontal axis and which support an upper power tool support platform thereatop. The device includes a plurality of elongated upright support members, each of which is individually connectable with the lower corners of the legs. An elongated upright extension is slidably engaged with each support member whereby each extension may be independently vertically lockably positioned to extend downwardly. An enlarged ground-engaging pad is attached to a lower end of each said extension whereby each pad may be independently vertically adjusted and secured to establish a desired height greater than the fixed height of the stand and level orientation of the power tool support platform, even atop irregular terrain. An alternate self-contained embodiment includes a perimeter frame carrying support members and extensions.

5 Claims, 4 Drawing Sheets

FOLDING POWER TOOL STAND ELEVATING DEVICE

BACKGROUND OF THE INVENTION

1. Scope of Invention

This invention relates generally to portable support stands for power tools utilized in the construction industry, and more particularly to a means for adjustably increasing the height of and leveling the power tool platform of the support stand.

2. Prior Art

In the construction industry, a wide variety of electrical power tools are utilized. One general category of those power tools typically requires a support stand for securely placing the power tool thereatop, the stand typically resting atop either the ground or irregular terrain adjacent the building under construction.

One such support stand is typically x-shaped having pivotally connected u-shaped legs which are pivotally connected about a central horizontal pivotal axis. A flat power tool support platform rests atop the upper ends of the legs while a cross member connecting the lower ends of the legs also provides additional ground-support surface for deploying the stand atop loose or soft ground.

One such well-known power tool is known as a wet saw which is either provided with or adapted for use with a specific accessory x-shaped ground-engaging stand having common dimensions of height, width and length. However, the fixed height of the power tool support platform above ground is generally shorter than necessary for the average or above average height of a worker. Therefore, many workers utilizing a wet saw atop the conventional fixed height stands will typically become fatigued during repeated use of the saw in a stooped-over position.

No additional accessories for either increasing the height of the support platform or for accommodating deployment of the stand atop irregular or soft terrain adjacent a construction site are currently available.

A number of prior art devices which in some fashion disclose a portable stand are known to applicant as follows:

U.S. Pat. No. 5,984,245 to Hsu
U.S. Pat. No. 4,763,865 to Danner
U.S. Pat. No. 5,816,545 to Malizia
U.S. Pat. No. 4,860,807 to Vacchiano
U.S. Pat. No. 5,358,204 to Terada
U.S. Pat. No. 5,876,011 to Blasing
U.S. Pat. No. 4,917,341 to Pirchio However, none of these prior art patented devices provide sufficient teaching or disclosure which would lead to a device or apparatus for the adjustable elevating of the overall height of power tool stand of the above-described nature and/or which in any way accommodates the irregular and softer terrain or ground surface associated with a construction site.

BRIEF SUMMARY OF THE INVENTION

This invention is directed to a folding power tool stand elevating device, the stand having fixed height x-shaped ground-engaging legs which pivot about a central horizontal axis and which support an upper power tool support platform thereatop. The device includes a plurality of elongated upright support members, each of which is individually connectable with the lower corners of the legs. An elongated upright extension is slidably engaged with each support member whereby each extension may be independently vertically lockably positioned to extend downwardly. An enlarged ground-engaging pad is attached to a lower end of each said extension whereby each pad may be independently vertically adjusted and secured to establish a desired height greater than the fixed height of the stand and level orientation of the power tool support platform, even atop irregular terrain. An alternate self-contained embodiment includes a perimeter frame carrying support members and extensions.

It is therefore an object of this invention to provide an adjustable height increasing means for a fixed height power tool stand of the x-frame configuration.

It is yet another object of this invention to provide a device for the steady, level deployment of a power tool stand on irregular terrain.

Yet another object of this invention is to provide a self-contained device for supporting a power tool stand on irregular terrain and at an increased height greater than the fixed height of the stand.

In accordance with these and other objects which will become apparent hereinafter, the instant invention will now be described with reference to the accompanying drawings.

DETAILED DESCRIPTION OF THE INVENTION

Figure 1:
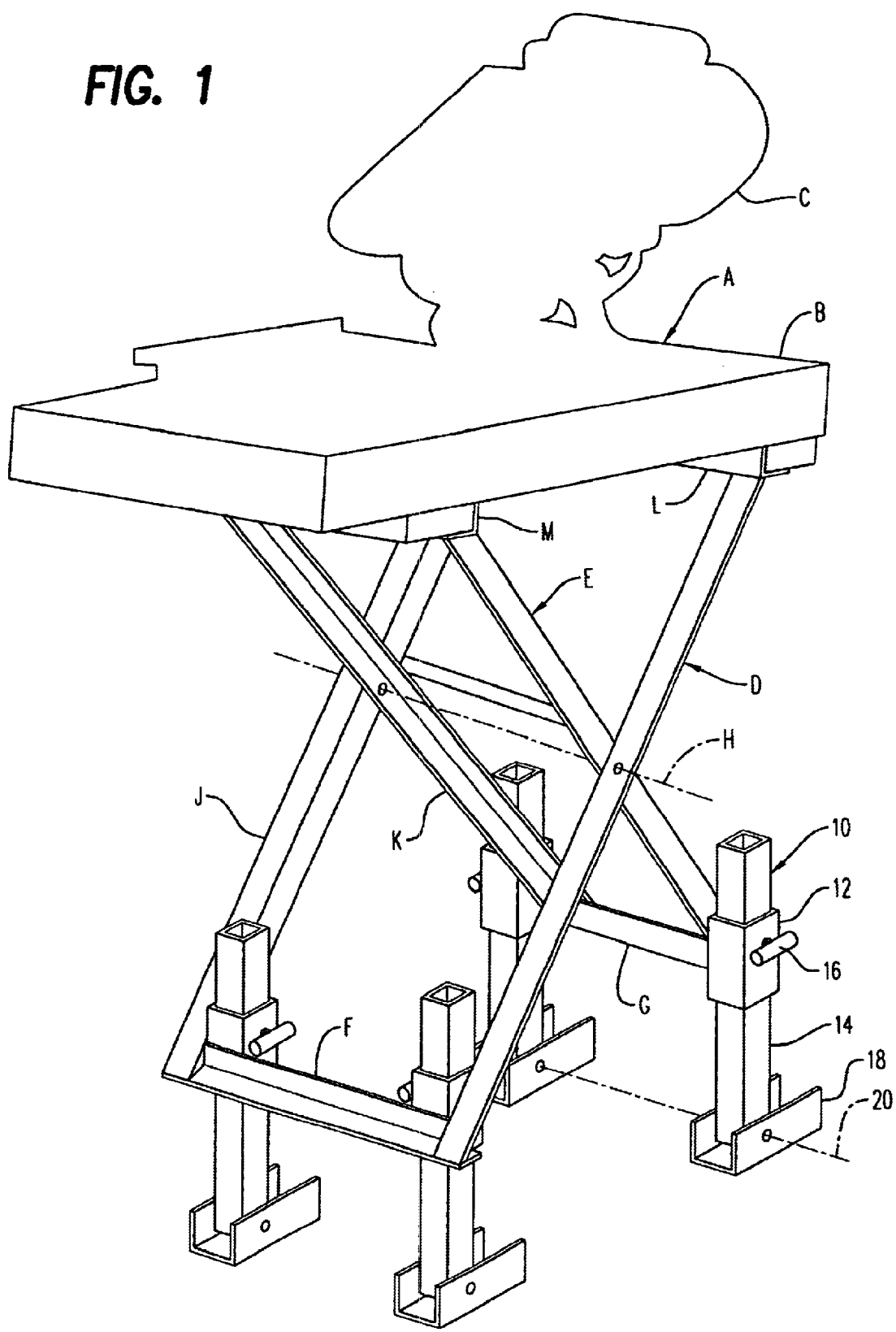
FIG. 1 is a perspective view of one embodiment of the invention attached to the lower ends of the legs of a power tool stand showing the support platform and outline of a power tool.
Figure 2:
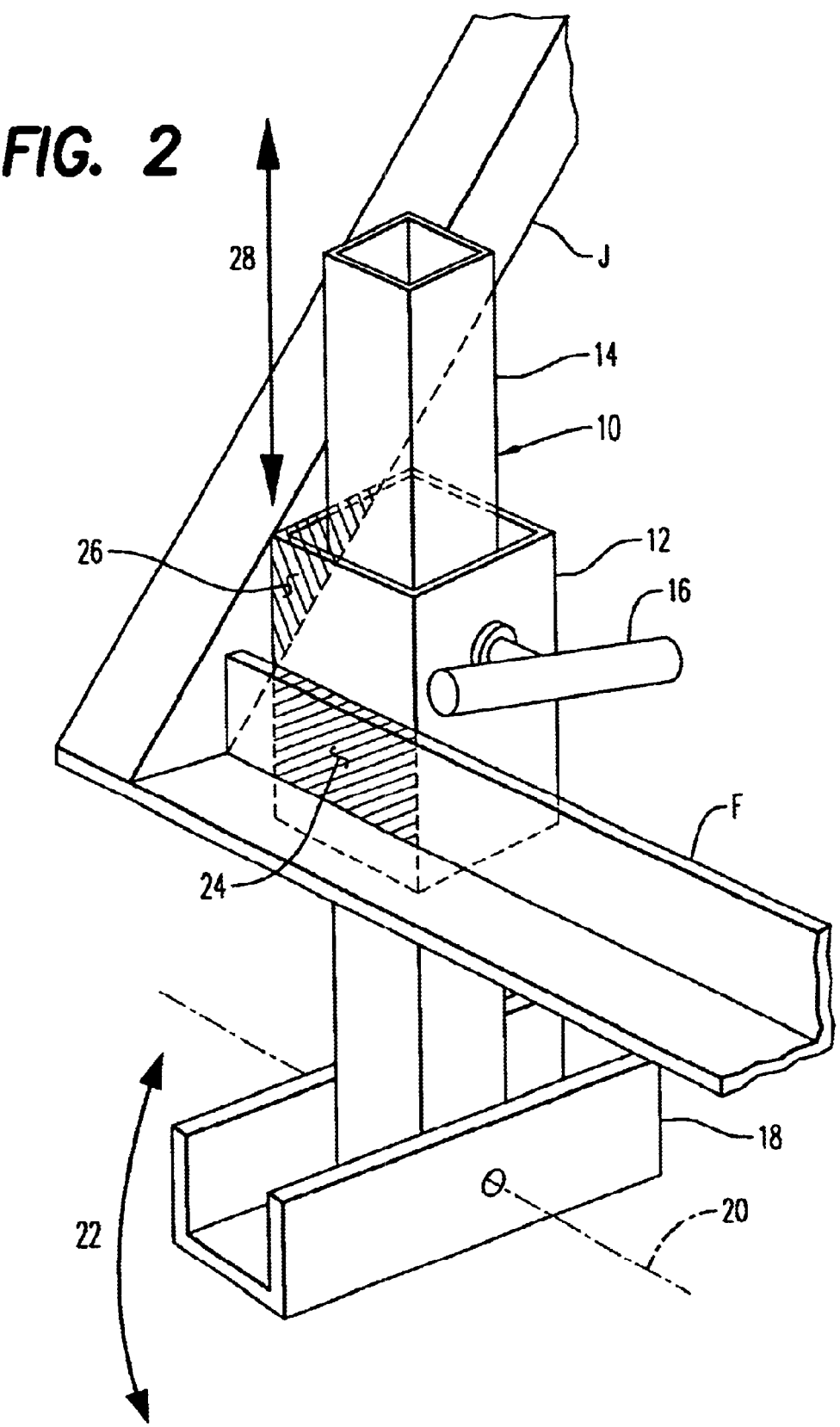
FIG. 2 is an enlarged view of one of the devices of FIG. 1 attached to one lower corner of the power tool stand.

Referring now to the drawings, and first to FIGS. 1 and 2, one embodiment of the invention is there shown at numeral 10 attached at each lower corner of a conventional power tool stand shown generally at letter A. The stand A includes an upper horizontal platform B for supporting a power tool C thereatop. The preferred power tool and stand combination is that of a wet saw and dedicated support stand.

The stand A includes two generally u-shaped ground-engaging legs D and E which are pivotally connected together along an overlapping central portion thereof about horizontal pivotal axis H. The upper ends of these legs D and E are connected together by lengths of angle iron L and M, respectively to support the horizontal platform B thereatop when deployed during use. The lower ends J and K of the U-shaped legs D and E, respectively, are connected together by angle iron shaped cross members F and G, respectively, which are oriented as shown to provide a flat, horizontal ground-engaging surface for more stable deployment of the stand A atop soft ground.

When deployed as shown in FIG. 1, the stand A is of a fixed height which is typically relatively short for average and taller users. Accordingly, the platform B is lower than desired so that a taller user will typically have to stoop over to use the power tool C, preferably, again, a wet saw for tile installation.

The present invention, shown attached at 10 at each of the lower corners of the stand A, includes an outer upright support member 12 preferably having a square tubular configuration and an inner elongated upright extension 14 also formed of square tubular stock and closely slidably engaged within the outer support member 12.

Each of the support members 12 is attached either by mechanical fastener means or by permanent weldment or adhesion at overlapping surfaces shown cross-hatched at 24 and 26 in FIG. 2. Thus, one portion of one side of the support member 12 bears against and is attached to the upright flange of cross member F at 24, while an orthogonal surface of the support member 12 bears against and is attached to the inner facing flange J at 26.

By this arrangement, the extension 14 is slidably moveable vertically in the direction of arrow 28. To secure a particular height adjustment, a threaded t-handle 16 bears against the corresponding outer surface of the extension 14 in a conventional manner.

An enlarged U-sectioned ground-engaging pad 18 is also provided which is pivotally connected about transverse axis 20 so that the pad 18 is pivotable freely in the direction of arrow 22. However, these ground-engaging pads 18 may also be universally connected or fixed in place in coplanar fashion. When the stand A with each of the devices 10 attached either removably or preferably permanently to each lower corner of the legs D and E as shown in FIG. 1, each of the extensions 14 may be vertically adjusted in the direction of arrow 28 to both increase the height of the platform B above the ground to a height greater than that of the fixed height of the stand A itself, and to then individually adjust the extensions 12 so that the pads 18 will work themselves into the loose ground after which further adjustment will result in a substantially level orientation of the platform B.

Figure 3:
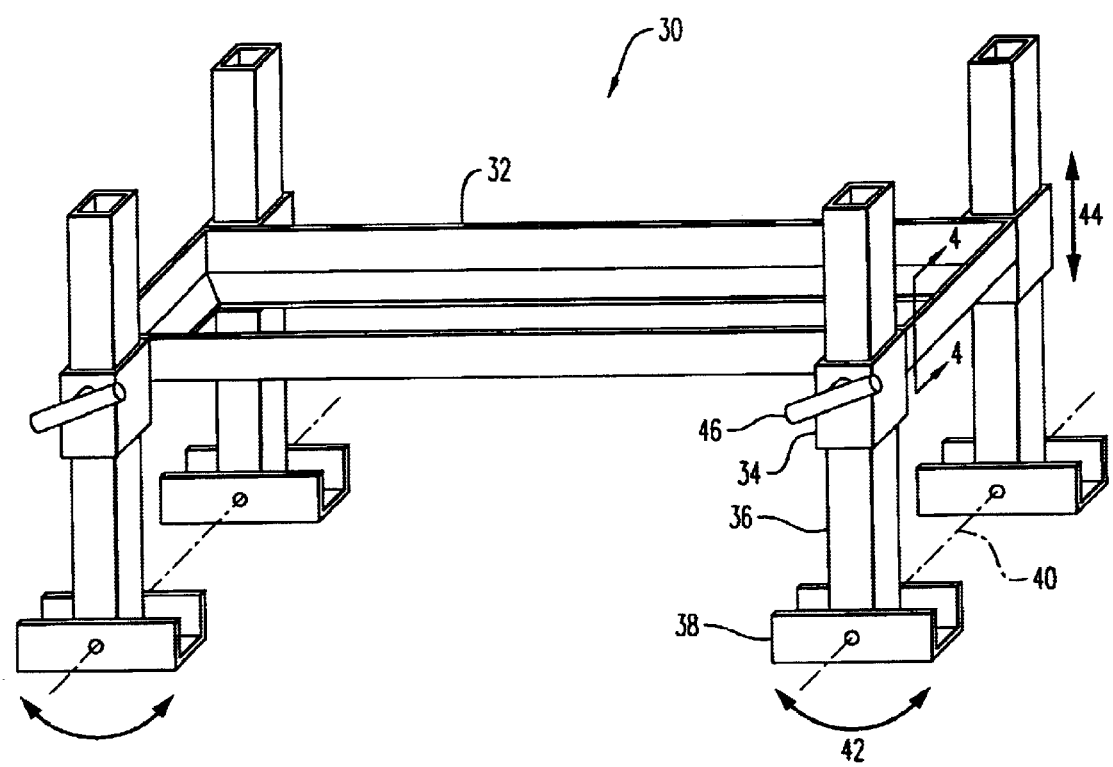
FIG. 3 is a perspective view of another embodiment of the invention.
Figure 4:
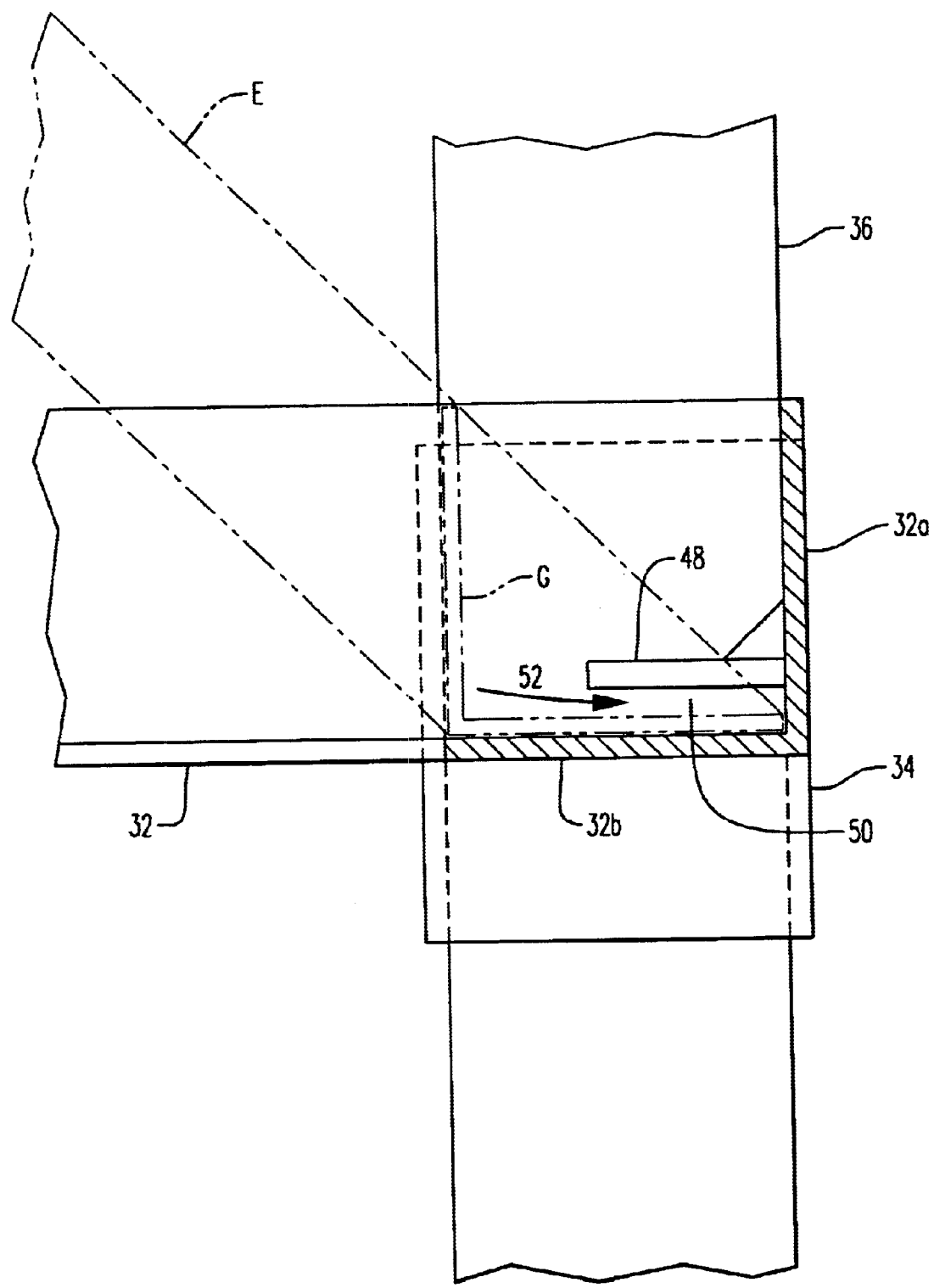
FIG. 4 is a section view in the direction of arrows 4—4 in FIG. 3.

Referring now to FIGS. 3 and 4, an alternate embodiment of the invention is there shown generally at numeral 30. This embodiment 30 is self-contained and is preferably not permanently attached to the stand A as shown in FIG. 1. This embodiment 30 includes a rectangular perimeter frame 32 formed of L-sectioned angle iron as shown. The sizing of the perimeter frame 32 in width and length is selected to be generally equal to the overall deployed lower perimeter of the stand A as defined by the lower leg portions J and K and the cross members F and G in FIG. 1.

An elongated upright support member 34, preferably rectangular and tubular in construction, is permanently attached to each corner of the perimeter frame 32 as shown. Each of these upright support members 34 is oriented orthogonally to the perimeter frame 32 and is sized to matably and slidably receive an elongated upright extension 36 also formed of tubular stock. By this arrangement, the extension 36 is vertically moveable in the direction of arrow 44 in FIG. 3 so that an appropriate vertical positioning of the extension 36 may be attained.

A T-shaped threaded locking member 46 is threadably engaged into one wall of the support member 34 so that the desired positioning of the extension 36 may be releasably secured when the device 30 is deployed. To increase overall stability, U-shaped enlarged ground-engaging pads 38 are pivotally connected about a transverse pivotal axis 40 to the lower end of each extension 36 so that each of the pads 38 may be freely pivotable in the direction of arrows 42.

By this arrangement, this embodiment 30 may be first easily deployed atop the ground, adjusted for desired height and level conditions by individually adjusting each of the extensions 36 and then locking that adjusted position by the corresponding t-handled locking device 46. Thereafter, the power tool stand A as seen in FIG. 1 may be opened into the deployed position for use and then set within the perimeter frame 32 as shown in phantom in FIG. 4.

To temporarily and automatically lockably engage the cross member G and, consequently, the entire stand A in its in-use position within the perimeter frame 32 of device 30, a retaining plate 48 is attached to, and inwardly extends from, the inner surface of one upright leg 32a of the perimeter frame 32. By this arrangement, the horizontal flange of cross member G will slide in the direction of arrow 52 into the gap 50 formed between the lower horizontal surface 32b and the retaining plate 48 as shown in FIG. 4. When the stand A is to be folded and stored, the cross member G will easily be freed from the retaining slot 50 after the opposite end of the stand is raised from being supported within the perimeter frame 32.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A folding power tool stand elevating device, the stand having fixed height x-shaped ground-engaging legs which pivot about a common central horizontal axis and which support an upper power tool support platform thereatop, said device comprising:

a plurality of elongated upright support members each of which is individually connectable to a lower ground-engaging end of each of the corners of the legs;

an elongated upright extension slidably engaged with each of said support members whereby each said extension may be independently slidably positioned vertically within a corresponding said support member to adjustably extend downwardly therefrom;

an enlarged ground-engaging pad attached to a lower end of each said extension;

a locking member attached to each said support member and being selectively engageable with a corresponding said extension to secure a selected vertical position for each said extension whereby each said pad may be independently vertically adjusted and secured to establish a desired height greater than the fixed height and substantially level orientation of the support platform.

2. A folding power tool stand elevating device as set forth in claim 1, wherein:

said support members and said extensions are formed of mating tubular material;

each said pad is pivotally connected to a corresponding said extension.

3. A folding power tool stand elevation increasing device for a power tool stand having x-shaped ground-engaging legs of fixed height when deployed which are pivotally connected together about a common central horizontal axis and which support an upper power tool support platform horizontally thereatop, said device comprising:

a generally rectangular perimeter frame sized to supportively receive the lower ground-engaging ends of the legs;

an elongated upright support member connected to each corner of said frame;

an elongated upright extension slidably engaged with each of said support members whereby each said extension may be independently slidably positioned vertically within a corresponding said support member to adjustably extend downwardly therefrom to accommodate resting upon irregular ground;

a ground-engaging pad pivotally attached to a lower end of each said extension;

a locking member attached to each said support member and being selectively engageable with a corresponding said extension to secure a selected vertical position for each said extension whereby each said pad may be independently selectively vertically adjusted and secured to establish a desired height greater than a fixed height of the power tool stand and level orientation of the support platform;

a retaining member connected to, and cooperatively positioned with respect to one end of said perimeter frame to trappingly releasably engage with one of the cross members of the stand when the stand is deployed atop said perimeter frame.

4. A folding power tool stand elevation device having x-shaped ground-engaging legs which pivot about a common central horizontal axis and which support an upper power tool support platform thereatop, said device comprising:

a rectangular perimeter frame having a length and width substantially equal to that of, and for supportively receiving, the lower ground-engaging ends of the legs;

an elongated upright tubular support member connected to each of the corners of said frame;

an elongated tubular upright extension matably slidably engaged within each of said support members whereby each said extension may be independently slidably positioned vertically within a corresponding said support member to adjustably extend downwardly therefrom;

an enlarged ground-engaging pad pivotally attached to a lower end of each said extension;

a locking member threadably attached to each said support member and being selectively engageable with a corresponding said extension to secure a selected vertical position for each said extension whereby each said pad may be independently vertically adjusted and secured to establish a desired height and level orientation of the power tool support platform when said device is placed atop level or irregular terrain.

5. A folding power tool stand elevating device as set forth in claim 4, wherein the stand includes an elongated cross member extending transversely between the lower ends of each corresponding pair of legs, further comprising:

a retaining member connected to, and cooperatively positioned with respect to one end of said perimeter frame to trappingly releasably engage with one of the cross members of the stand when the stand is deployed atop said perimeter frame.

* * * * *